United States Patent [19]

Holzmeier

[11] Patent Number: 5,266,603
[45] Date of Patent: Nov. 30, 1993

[54] PROCESS FOR THE PRODUCTION OF EXPANDABLE STYRENE POLYMERS IN BEAD FORM

[75] Inventor: Peter Holzmeier, Marl, Fed. Rep. of Germany

[73] Assignee: Huels Aktiengesellschaft - PB 15, Marl, Fed. Rep. of Germany

[21] Appl. No.: 29,616

[22] Filed: Mar. 11, 1993

[30] Foreign Application Priority Data

Jun. 13, 1992 [DE] Fed. Rep. of Germany ....... 4219379

[51] Int. Cl.$^5$ ............................................. C08J 9/20
[52] U.S. Cl. ...................................... 521/56; 521/60; 521/94; 521/95; 521/96; 521/146
[58] Field of Search ................... 521/56, 60, 146, 94, 521/95, 96

[56] References Cited

U.S. PATENT DOCUMENTS

| | | |
|---|---|---|
| 3,192,169 | 6/1965 | Doak . |
| 4,129,531 | 12/1978 | Rauer et al. ............. 521/94 |
| 4,166,890 | 9/1979 | Fried et al. ............. 521/95 |
| 4,460,748 | 7/1984 | Rauer ..................... 521/95 |
| 4,465,792 | 8/1984 | Carr et al. .............. 521/96 |
| 4,636,528 | 1/1987 | Kamens et al. ........ 521/96 |
| 4,683,248 | 7/1987 | Rauer et al. ........... 521/96 |
| 4,692,269 | 9/1987 | Kmiec et al. .......... 521/95 |
| 5,118,718 | 6/1992 | Walter et al. .......... 521/59 |

FOREIGN PATENT DOCUMENTS 691908 5/1953 United Kingdom .

Primary Examiner—Morton Foelak
Attorney, Agent, or Firm—Oblon, Spivak, McClelland, Maier & Neustadt

[57] ABSTRACT

A process for the production of particulate expandable styrene polymers which have a very low benzene concentration is described using perketal and/or monoperoxycarbonate polymerization initiators. The styrene polymers produced according to the invention can be foamed to give foamed particles and molded, if desired.

8 Claims, No Drawings

PROCESS FOR THE PRODUCTION OF EXPANDABLE STYRENE POLYMERS IN BEAD FORM

BACKGROUND OF THE INVENTION

1. Field of the Invention

The present invention relates to a process for the production of particulate, propellant-containing styrene polymers. More particularly, the present invention relates to a process for producing propellant-containing styrene polymers having a reduced residual monomer content as well as a distinctly lower benzene concentration than prior art materials. The invention also relates to the product propellant-containing particulate polymers themselves, foamed particles thereof and moldings comprising these polymers.

2. Discussion of Background

Particulate foams based on styrenic polymers have achieved considerable industrial importance as packaging and heat insulating materials. These foams are produced on an industrial scale by suspension polymerization of styrene in the presence of a propellant. During processing, the particulate expandable styrene polymer (EPS) is first foamed by applying heat to give foamed particles which may then be welded in closed molds to give moldings.

The suspension polymerization of styrene to produce expandable styrene polymers is usually carried out in a discontinuous process which uses two different temperature steps and two different peroxide polymerization initiators having different half-lives. Usually, dibenzoyl peroxide is used during a first polymerization step at 80° to 90° C. and tert-butyl perbenzoate, which decomposes at a higher temperature than dibenzoyl peroxide, is used during a second polymerization step at 105° to 130° C. in order to provide a product having a residual monomer content which is as low as possible.

Unfortunately, the expandable styrene polymers produced by this process contain benzene in concentrations of 0.002 to 0.01 percent by weight, typically 0.003 to 0.005 percent by weight. While the benzene can be liberated by heat treatment of the styrene polymers during treatment processes, the benzene concentration in the finished product is still from 0.0005 to 0.001 percent by weight.

OBJECTS OF THE INVENTION

An object of the present invention is to produce expandable styrene polymers which have a distinctly reduced benzene content in order to prevent the undesired emission of benzene during any subsequent treatment processes or during use.

Another object of the present invention is the production of substantially benzene-free foamed particles and moldings.

Another object of the present invention is to provide expandable styrene polymers, foamed styrene polymers and molded styrene polymers which are substantially benzene-free.

SUMMARY OF THE INVENTION

The above objects have been achieved through the use of particular styrene-soluble peroxides in place of the second initiator used in the suspension polymerization reaction of styrene described above. Aliphatic and cycloaliphatic perketals having 4 to 8 and 6 to 8 carbon atoms in the aliphatic chain and cycloaliphatic ring, respectively, in particular C-C-aliphatic and cycloaliphatic perketals like
2 2-bis(tert-butylperoxy)butene and
1,1-bis(tert-butylperoxy)cyclohexane, and also C-C-monoperoxycarbonates having 12 to 16 carbon atoms like 2-ethylhexyl tert-amyl peroxycarbonate and 2-ethylhexyl tert-butyl peroxycarbonate have been found to provide particulate EPS polymers which have an extremely low concentration of benzene and an extremely low residual monomer concentration when these perketals and/or monoperoxycarbonates are used as the second, higher temperature, initiator in the suspension polymerization reaction of styrene.

While the use of monofunctional and difunctional nonaromatic initiators in the suspension polymerization of styrene has been disclosed in Japanese published applications 56-167706 and 60-031536, the reason such initiators were used in these publications is not for lowering the benzene concentration in the polymer but for achieving a specific molecular weight distribution.

According to the present invention, the benzene content of particulate styrene polymers is reduced to values less than 0.0005 percent by weight by using one of the above-mentioned initiators during the polymerization of styrene; the polystyrene foamed particles and moldings produced from the product EPS polymers by foaming and welding, respectively, have benzene concentrations of less than 0.0002 percent by weight.

The particulate styrene polymers according to the present invention also have a substantially lower residual monomer content as compared to conventional products, such as those polymerized in the presence of tert-butyl perbenzoate. For example, 2-ethylhexyl tert-amyl peroxycarbonate and 2,2-bis(tert-butylperoxy)butane provide particulate styrene polymers with residual monomer contents of less than 0.04 percent by weight using the same polymerization process as that used with tert-butyl perbenzoate.

DETAILED DESCRIPTION OF THE INVENTION

The present invention relates to a process for the production of particulate expandable styrene polymers by polymerization of an aqueous suspension of styrene at temperatures of from 80° to 130° C. in the presence of conventional suspension stabilizers and 3 to 15 percent by weight of a $C_3$–$C_6$-hydrocarbon as propellant, in which process 0.15 to 0.5 percent by weight of dibenzoyl peroxide or of a peroxide with a comparable half-life (examples of which are dilauroyl peroxide and azoisobutyronitrile) are added and used as low temperature free radical-forming polymerization initiators and wherein 0.05 to 0.6% by weight, preferably 0.1 to 0.4% by weight, of one or more of the above-mentioned perketals and/or monoperoxycarbonates are added and used as a peroxide initiator which decomposes at higher temperature. The present invention also relates to the particulate expandable styrene polymer thus produced, foamed particles thereof and molded products thereof.

Styrene polymers according to the present invention are homopolystyrene and copolymers of styrene containing at least 50% by weight of styrene monomers. Suitable comonomers are, for example, a-methylstyrene, styrenes whose aromatic nucleus is mono- or polyhalogenated in the 2-6 positions, acrylonitrile, acrylic acid esters and methacrylic acid esters of alcohols having 1 to 8 carbon atoms and N-vinyl compounds, such as N-vinylcarbazole.

The expandable styrene polymers of the present invention contain 3 to 15 percent by weight, preferably 5 to 8 percent by weight, of known $C_3$ to $C_6$ hydrocarbons such as propane, butane, isobutane, n-pentane, 1-pentane, neopentane, hexane and cyclohexane, or mixtures of these compounds, as propellants.

The suspension stabilizers used in preparing the invention EPS polymers include organic protective colloids, such as polyvinyl alcohol, polyvinylpyrrolidone and hydroxyethylcellulose, as well as water-insoluble dispersing agents, such as finely divided tricalcium phosphate, magnesium oxide and barium phosphate; mixtures of organic protective colloids and water-insoluble dispersing agents may also be used.

The styrene polymers of the present invention can also contain effective amounts of other substances which impart specific properties to the expandable product. Examples include flameproofing agents such as tetrabromocyclooctane, hexabromocyclododecane and brominated polybutadiene, and synergists for flameproofing agents, such as dicumyl peroxide, and other free radical-forming substances which have a half-life of at least two hours at 373 K. The expandable styrene polymers can also contain additives, such as dyes and fillers, and stabilizers.

Having generally described this invention, a further understanding can be obtained by reference to certain specific examples which are provided herein for purposes of illustration only and are not intended to be limiting unless otherwise specified.

EXAMPLE 240 kg of water, 400 g of hydroxyethylcellulose, 800 g of tricalcium phosphate and 24 g of EDTA were initially introduced, as a suspending medium, into a 600 liter reactor. A solution of 960 g of dibenzoyl peroxide and 480 g of 2-ethylhexyl tert-butyl peroxycarbonate in 240 kg of styrene was added thereto as the organic phase.

The mixture was heated to 90° C. over the course of 1 hour, with stirring, and maintained at this temperature for 3.5 hours. 120 g of polyvinyl alcohol and 20.4 kg of pentane were then metered in over the course of 1 hour with simultaneous heating to 110° C. After a further 6.5 hours of polymerization time had passed the batch was cooled and discharged through a suction filter and the particulate polymer was washed with water, dried, sieved and characterized. The results are reported below:

| | |
|---|---|
| Yield: | 253 kg |
| K value: | 53.9 |
| Monostyrene: | 385 mg/kg |
| Benzene: | 4.7 mg/kg |
| Propellant content: | 6.18% by weight |
| Water content: | 0.09% by weight |

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for the production of particulate expandable styrene homopolymers or copolymers comprising the steps of:
    providing an aqueous suspension comprising styrene monomer, a peroxide initiator other than an aliphatic or cycloaliphatic perketal or monoperoxycarbonate and at least one aliphatic or cycloaliphatic perketal or monoperoxycarbonate initiator,
    heating the aqueous suspension to a temperature of from 80° to 100° C. with stirring for a first period of time to effect initial polymerization,
    adding a $C_3$–$C_6$ hydrocarbon propellant to the aqueous solution at 80° to 100° C. with stirring,
    increasing the temperature of the aqueous suspension containing the propellant to a temperature of from above 100° C. to 130° C. for a second period of time to effect final polymerization,
    wherein the peroxide initiator has a shorter half-life in the aqueous suspension at from 80°–100° C. than the perketal or monoperoxycarbonate initiator.

2. A process according to claim 1, wherein the perketal is 2,2-bis(tert-butylperoxy)butane or 1,1-bis(tert-butylperoxy)cyclohexane.

3. A process according to claim 1, wherein the monoperoxycarbonate is 2-ethylhexyl tert-amyl peroxycarbonate or 2-ethylhexyl tert-butyl peroxycarbonate.

4. A process according to claim 1, wherein dibenzoyl peroxide is the peroxide initiator.

5. A process according to claim 1, wherein the initial polymerization is carried out at 80° to 90° C. and the final polymerization is carried out at 105° to 130° C.

6. A particulate expandable polystyrene particle produced by the process described in claim 1.

7. A foamed particle produced by heating the particulate expandable polystyrene particle of claim 6.

8. A molded product comprising the foamed particle of claim 7.

* * * * *